April 12, 1932.  W. E. BAKER  1,854,095

WATER LEVEL INDICATOR

Filed Oct. 31, 1924  4 Sheets-Sheet 1

Inventor:
William E. Baker
By: Wm O. Belt
Atty.

April 12, 1932.   W. E. BAKER   1,854,095
WATER LEVEL INDICATOR
Filed Oct. 31, 1924   4 Sheets-Sheet 2
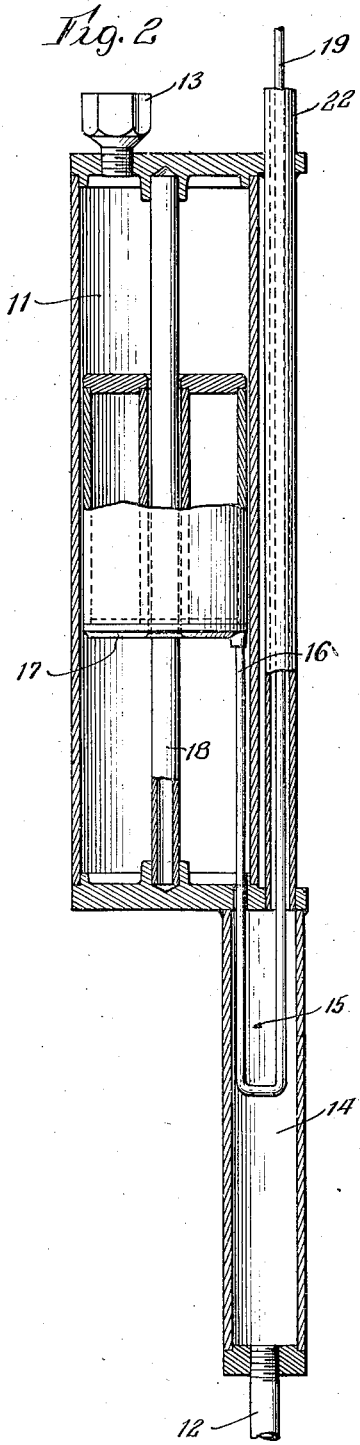
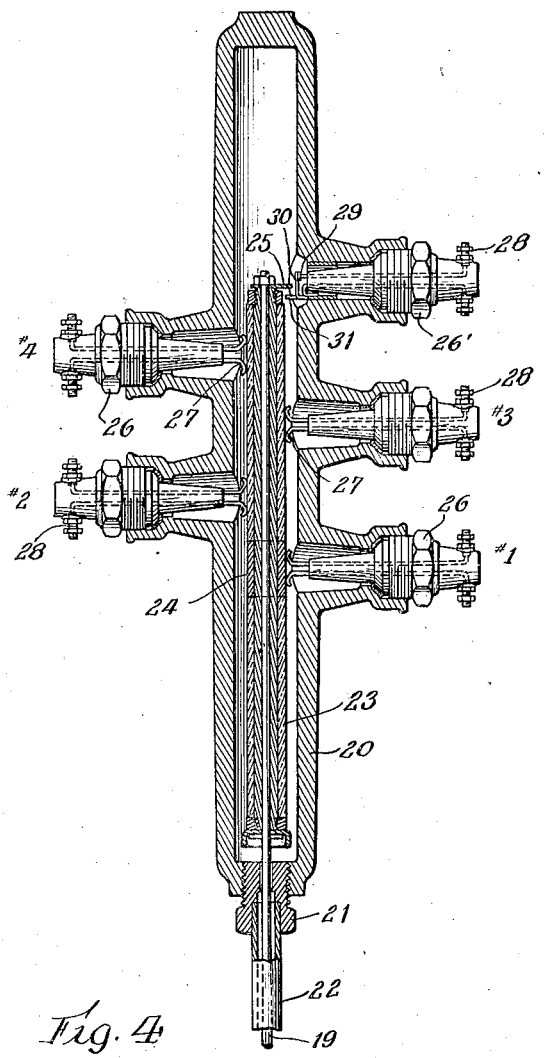
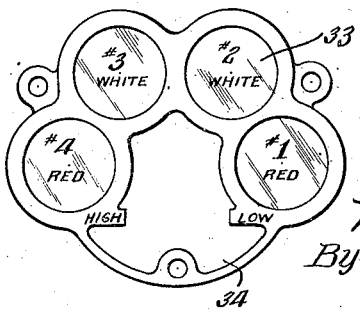
Inventor:
William E. Baker
By: Wm O Bell
Atty.

April 12, 1932.  W. E. BAKER  1,854,095
WATER LEVEL INDICATOR
Filed Oct. 31, 1924   4 Sheets-Sheet 4
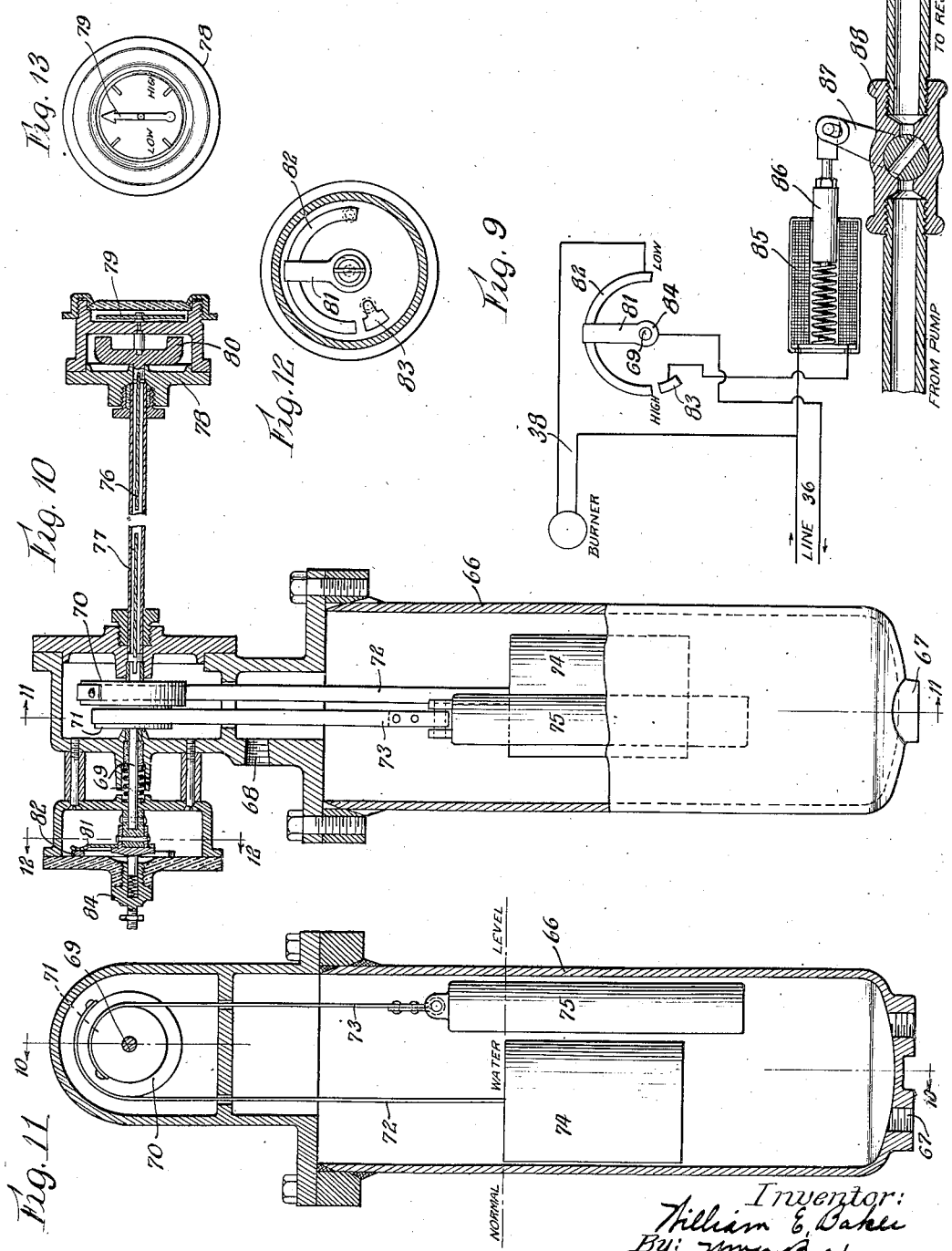

Patented Apr. 12, 1932

1,854,095

UNITED STATES PATENT OFFICE

WILLIAM E. BAKER, OF ERIE, PENNSYLVANIA

WATER LEVEL INDICATOR

Application filed October 31, 1924. Serial No. 747,139.

This invention relates to a novel and improved water level control and indicator for use with a water supply of any description, but of particular use with a steam generator. The particular object of my invention is to devise a novel and improved water level control which is entirely automatic in operation.

A further object is to provide an indicator for use with such a control which may be placed at a distance from the water, the level of which is being controlled. By this means it is possible to employ my invention in many places where the ordinary type of indicator or gauge is impractical. For example, I may employ my invention in a boat or automobile.

A still further object is to provide a control for the water level in a steam generator or the like which is governed by the level of the water itself.

A still further object is to provide an indicator which will always be clean. This object I achieve by avoiding the passage of water through my indicating means, as is common in the ordinary type of water gauge.

A still further object is to provide means controlled by the level of water in a generator or the like, which will automatically cut out the heating means for the generator upon the water in the generator reaching a low point.

And a still further object is to provide means for automatically admitting water to a generator or the like upon the water therein becoming low.

A still further object is to provide a novel and improved float for use with my control indicator.

Further objects will become apparent during the progress of the description.

In the drawings in which I have shown selected embodiments of my invention

Fig. 2 is a vertical sectional view through the float chamber of Fig. 1.

Fig. 3 is a vertical sectional view through the indicator switches of Fig. 1.

Fig. 4 is a front view of the indicator of Fig. 1.

Fig. 9 is a diagrammatic view of another form of control.

Fig. 10 is a vertical sectional view through the mechanism employed with the control of Fig. 9 and taken on the line 10—10 of Fig. 11.

Fig. 11 is a vertical sectional view taken on the line 11—11 of Fig. 10.

Fig. 12 is a section on the line 12—12 of Fig. 10, and

Fig. 13 is a face view of the indicator of Fig. 10.

Figure 1:
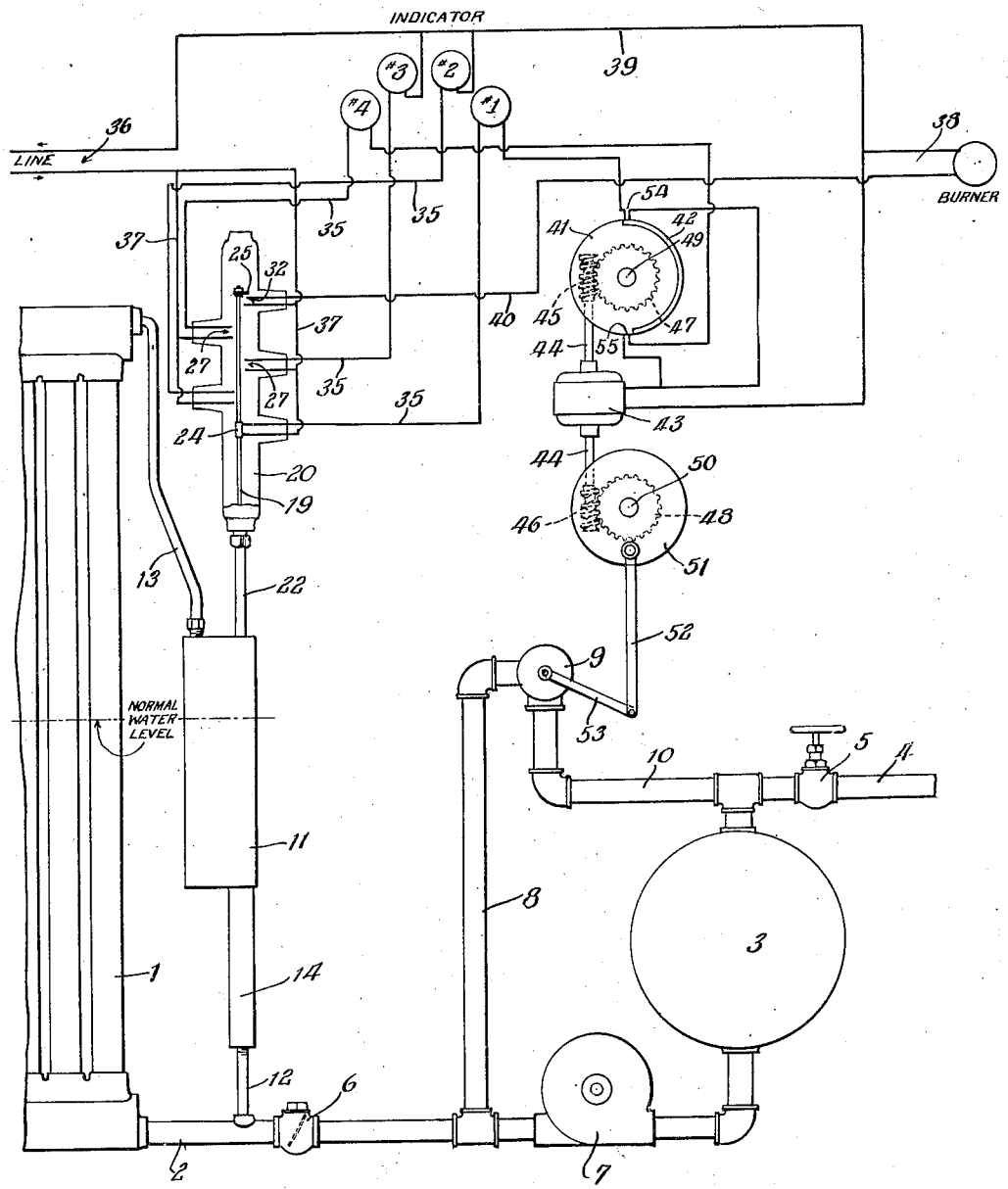
Fig. 1 is a diagrammatic view of one form of control and indicator.

Referring now to the drawings, and particularly to Figures 1, 2, 3 and 4, I have shown at 1 a water container, such as a steam generator which may be of any suitable construction supplied with water through the pipe 2 from the tank 3. This water may be brought to the tank 3 from any suitable source of supply by the pipe 4 having a valve 5. The tank 3 I shall hereafter designate as the reservoir, it being understood that by that term I mean any source of water. Suitably placed in the pipe 2 is a check valve 6 which is normally closed, but which is adapted to be opened by an excess of pressure on the outside thereof, that is, on the side away from the generator. When the pressure in the generator is greater than that outside of the valve 6, said valve is closed, and then the water in the reservoir 3 is forced by the pump 7 through pipe 8, by-pass valve 9 and pipe 10 back to the tank.

Conveniently placed in relation to the steam generator I provide the float chamber 11 having a connection 12 whereby water from the generator may freely enter, and a steam connection 13 to the upper portion of the generator. The lower portion of the float chamber 11 is provided with an extension 14 to receive a vertically moving U-shaped rod 15, connected at one side 16 to a suitable float 17 adapted to move vertically on a support 18 in the float chamber. The other side 19 of the U-shaped member 15 (Fig. 2) enters an indicator casing 20 (Fig. 3). It is to be understood that the structure shown in Fig. 3 is disposed substantially vertically above that shown in Fig. 2, although that is not necessary so long as free vertical movement of the side 19 is possible.

The side 19 enters the casing 20 through an air-tight sleeve 21 and is covered throughout its length by a tubular member 22 which forms, in effect, a continuation of the chamber 11. By this means the indicator may be placed a substantial distance away from the float chamber and kept clean and free from water, steam and dirt, which is a decided advance over the usual glass steam gauge in which the water is permitted to rise and fall. These gauges rapidly become dirty and at times it is difficult to find the water level therein without close scrutiny. The casing 20 is substantially air-tight and being placed above the chamber 11 which, of course, is of such a size as to cover the range of rise and fall of water in the generator, no water can follow the member 19 into the indicator. Likewise, the water in the bottom of the float chamber serves as a trap to prevent the passage of steam through the member 22, thus insuring cleanliness in the indicator casing.

Upon the end of the side 19 within the casing 20 I provide an insulating tube 23 mounted thereon by any suitable means and provided at one point in its length with a short tubular member 24 of conducting material. At the extreme end of the side 19 I provide a finger 25 projecting transversely from the side 19, for a purpose which will presently appear.

The casing 20 is provided with any desired number of plugs 26, each provided with a pair of contacts 27, each contact being electrically connected with suitable terminals 28 on said plugs. The contacts in the uppermost plug 26' comprise one contact 29 which is substantially rigid and another contact 30 mounted upon a spring arm 31, the contacts 29 and 30 normally being in engagement with each other, and the spring arm 31 projecting into the casing 20 a sufficient distance to come in the path of movement of the finger 25, whereby upon downward movement of the finger, it will open the switch constituted by the contacts 29 and 30. This switch is designated 32 in Fig. 1.

Fig. 4 shows an indicator which may be mounted in any convenient location and which I have shown as comprising a plurality of colored lights 33 mounted in a suitable frame 34. It will be noted that I have numbered plugs 26 as No. 1, 2, 3 and 4, and the lights 33 I have numbered to correspond. The terminals 28 are connected by suitable conductors to the lights of the indicator of corresponding number, and while these lights may be of any desired color I have shown Nos. 1 and 4 as being red, to indicate the highest and the lowest desirable levels of water, and the intermediate lights, Nos. 2 and 3, as white to indicate freedom from any dangerous or undesirable condition. The connections from the terminals 28 to the various lights are designated 35 in Fig. 1, and the connections from one side of a suitable line 36 are designated by numeral 37. From an inspection of Figs. 1 and 3 it will be evident that vertical movement of the member 24 is adapted to control the lights in the indicator. When the member 24 is in the position shown in Fig. 1, the circuit to No. 1 light is closed, thereby indicating danger. Further downward movement of the member 19 will cause the finger 25 to open switch 32 and this will start mechanism presently to be described for supplying more water to the generator and then the contact member 24 will move upwardly with the member 19 and will successively close the contacts to light the lights Nos. 2, 3 and 4.

I will now describe the means for governing the supply of water to the generator. While my invention may be employed with any device in which it is desirable to keep water within certain levels, I will describe it as being employed with a burner such as shown in my co-pending application, Serial No. 735,511, filed September 2, 1924. In said application I disclose an oil burner employing a vaporizer, electrical ignition means, and a motor for operating means to feed oil and air to the burner. In Fig. 1 I have indicated at 38 the two sides of a circuit which includes the apparatus just mentioned, and which apparatus is designated "Burner" in said figure, and this circuit is connected to the line 36 on one side by a direct connection 39 and on the other side by a connection 40 passing through the switch 32. It will therefore be evident that upon opening of the switch 32 by finger 25 the circuit 38 will be opened, and therefore the motor and ignition means will be rendered inoperative. These means per se do not form any part of the present invention, and it is not deemed necessary to describe them further. I do intend, however, to claim as part of my invention the provision of means for opening a circuit which controls a burner, whereby when the water level becomes dangerously low, the burner which, it is understood, is placed in a position to heat the water in the steam generator, will be extinguished.

It will be noted that the circuit which includes light No. 1 also includes a rotary switch 41 having an arcuate contact member 42 extending through substantially 180°. This circuit further contains the motor 43 provided with a rotor shaft 44. This shaft is provided with worms 45 and 46 contacting with worm gears 47 and 48 respectively. The worm gear 47 is fixed on the shaft 49 carrying the switch 41, and therefore it will be seen that when the contact 24 closes the circuit through light No. 1 as shown in Fig. 1, the motor will be operated and will cause rotation of the shaft 44, which in turn will cause rotation of worm gears 47 and 48. Gear 48 is fixed on a shaft 50 carrying a crank 51 pivotally connected to a link 52, which in turn is pivotally connected to the handle 53 of the by-pass valve 9. It will be remembered that the by-pass valve 9 is normally opened. However, upon rotation of shaft 44, shaft 50 will be rotated and through the crank 51 and connections 52 and 53 the by-pass valve will be closed. The pump 7 is continuously operating and the result is that the pressure upon the check valve 6 is greatly increased thereby opening the check valve and forcing water into the generator. The shaft 49 is rotating in a counter-clockwise direction (Fig. 1) and therefore the circuit through light No. 1 remains closed through substantially 180° revolution of said shaft 49 or until contact 42 passes contacts 54. As the contacts 54 are opened by passage of the contact 42, contacts 55 are closed by the same contact 42. Therefore, it will be seen that the circuit through light No. 1 and through the motor is opened at 54 thereby stopping operation of the motor and all parts operated thereby but the circuit through light No. 4 is closed at 55 so as to be ready for operation in the manner presently to be described. The by-pass valve will remain in closed position, and the pump 7 will continue forcing water into the steam generator. As the water in the generator rises, the contact member 24 will successively close contacts to lights Nos. 2, 3 and 4. It will be seen that the circuit through light No. 4 includes the contacts 55 and the motor 43, and it will be remembered that the contacts 55 have been closed just previous to the stopping of the motor 43. Therefore, when the circuit through light No. 4 is closed by the contact 24, it will be evident that the motor 43 will be put in operation and the switch 41 will be rotated through substantially 180° to the position shown in Fig. 1. In that position the contacts 55 will be opened and the contacts 54 will be closed thereby stopping the motor at the end of substantially 180° of rotation of the switch, and placing the circuit through light No. 1 in readiness to operate the motor 43 again upon closing of the circuit by contact 42. During the operation of the motor 43 just described the shaft 50 is rotated through substantially 180° to again open the by-pass valve 9, whereupon the pump 7 again causes circulation of water through pipe 8, by-pass valve 9 and pipe 10 back to the reservoir 3. This causes the pressure upon the check valve to decrease on the outside thereof, whereby the pressure of the water inside the generator will cause the check valve 6 to close, and it will remain closed until the water again reaches such a low point as to cause contact member 24 to close the circuit through light No. 1 and the motor 43, when the cycle of operations just described will be repeated.

Figure 7:
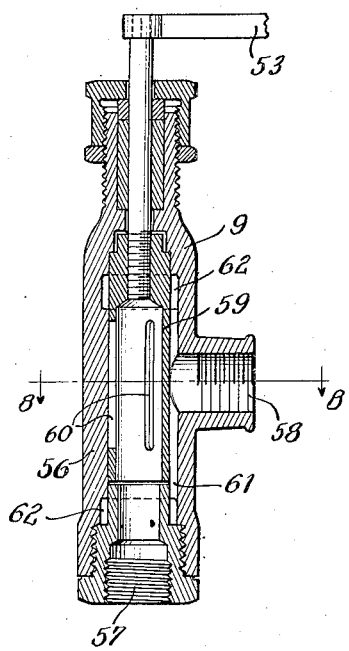
Fig. 7 is a vertical longitudinal section through a by-pass which I may employ with my control.
Figure 8:
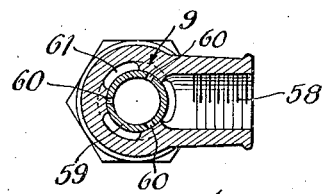
Fig. 8 is a section on the line 8—8 of Fig. 7.

In Figs. 7 and 8 I have shown a by-pass valve which may be employed with my control, although any other suitable valve may be used. This valve comprises a casing 56 provided with an inlet 57 and an outlet 58. Mounted within the casing is a rotatable tubular member 59 provided with a plurality of vertical slots 60 and the walls of the casing 56 are recessed to form a plurality of chambers 61 which have communication with one another through suitable passages 62. It will be evident that water flowing through the inlet 57 cannot reach the outlet 58 when the valve is in the position shown in Figs. 7 and 8, but upon rotation of the tubular member 59 by means of its handle 53 to a position wherein the slots 60 will register with the chambers 61, water will flow to the outlet.

Figure 5:
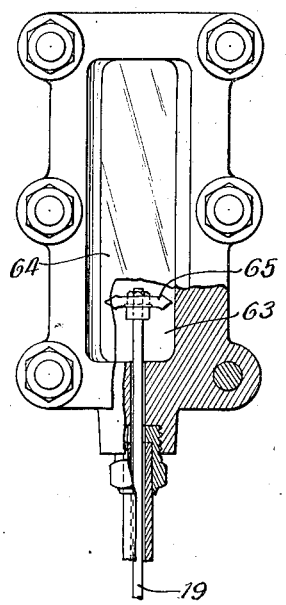
Fig. 5 is a front view partly in elevation and partly in section of another type of indicator.
Figure 6:
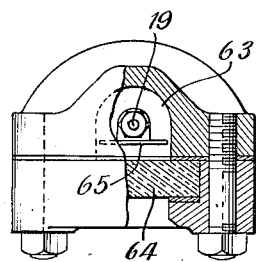
Fig. 6 is a view partly in plan and partly in section of the indicator of Fig. 5.

In Figs. 5 and 6 I illustrate a modification of an indicator which may be employed in place of that shown in Figs. 1, 3 and 4. This indicator is operated by the side 19 of the U-shaped member 15 in the same manner as is the indicator shown in Figs. 1, 3 and 4, and enters an air-tight casing 63 provided with a transparent member 64, whereby the pointer 65 may be readily seen. The casing 63 may be provided with a suitable scale if desired, and it will be evident that the member 19 may be provided with means similar to the members 24 and 25 to control the water level in the generator, or if desired with this modification such means may be omitted.

Referring now to Figs. 9 to 13 inclusive, I have shown a modified form of control wherein I employ a float chamber 66 having a water inlet 67 and a steam connection 68. Mounted in the upper portion of this chamber is a shaft 69 provided with a pair of discs 70 and 71. Secured to these discs are flexible strips 72 and 73 respectively carrying at their lower ends weighted members 74 and 75 respectively. These members are made of material differing in specific gravity, whereby a change in water level will result in a comparatively small rotation of the shaft 69 compared to what such rotation would be if caused by movement of a single float. I prefer to make my member 74 of aluminum and my member 75 of brass, and I so proportion these members that when they are in the position shown in Figs. 10 and 11, with the water level at normal, they will be balanced. A rise of water in the chamber will cause a comparatively slow rising of the aluminum member 74 and a sinking of the brass member 75. In other words, this float device operates by a difference of buoyancy, and it will be readily apparent that by proper selection of materials in regard to their specific gravity, any rate of rotation of the shaft 69 may be accomplished.

Connected to one end of the shaft 69 is a flexible shaft 76 contained in a tubing 77, and mounted upon any suitable support 78 such as an instrument board or the dash board of an automobile is an indicator comprising a pointer 79 operated by the shaft 76 through any suitable means, such as a magnet 80.

Upon the other end of the shaft 69, and suitably insulated therefrom is a contact finger 81 riding over a contact strip 82, and further adapted to engage a contact 83, detached from the contact 82. The center of the arm 81 is electrically connected by any suitable means with a terminal 84, and this terminal, as shown in Fig. 9, is connected to one side of the line 36 corresponding to the line 36 of Fig. 1. The contact strip 82 is electrically connected with one side of the burner circuit 38 which has been fully described in connection with the modification of Fig. 1, and the other side of which is connected to the other side of the line 36, as plainly shown in Fig. 9.

Referring now particularly to Fig. 9 it will be seen that the contact 83 is connected through a solenoid 85 with the side of the line 36 opposite to that which is connected with the terminal 84. The solenoid 85 is provided with a core 86 pivotally connected with the handle 87 of a by-pass valve 88. This by-pass valve 88 occupies the same position as the by-pass valve 9 shown in Figs. 1, 7 and 8, and serves the same purpose. When in the position shown in Fig. 9 it is evident that the valve is closed and current is flowing from the line 36 through the circuit 38 to operate the burner mechanism in said circuit. As the water in the generator becomes low, the contact arm 81 will rotate clockwise (Figs. 9 and 12) and at a low point approaching danger contact will be broken, and the circuit to the burner will be opened and the heating means will be rendered inoperative. The by-pass valve 88 being closed, the pump 7 is forcing water to the generator, as fully explained in connection with the modification of Fig. 1, and as the water level rises, the shaft 69 is rotated and the arm 81 again engages with the contact 82 to close the circuit to the burner, and the generator is again put in service. As the water level continues to rise, the arm 81 will engage with the contact 83 at or near the extreme high water level, which may be desirable, and then the solenoid 85 will be operated, as will be evident, to open the by-pass valve 88 and permit water to flow therethrough, thus decreasing pressure on the check valve 6 and permitting it to close. It will be evident that in this modification as in the others all the parts are fully protected so that there is no danger of steam, water or air entering the indicators or the operating means for the indicators.

From the above, it will be seen that I have provided novel and improved means for automatically controlling the level of water in a water container such as a steam generator, and while I have shown my invention as applied to a steam generator for which it is primarily designed, it is to be understood that it is by no means limited to such an application. I have found my invention to be extremely efficient in operation, and moreover, it will be observed that it is extremely flexible in that it may be applied to any type of structure whatsoever. Not only is the control capable of application to a variety of devices, but the indicators which I have shown may be applied to the same devices regardless of whether or not the water container, such as the generator, is in sight or out of sight. This is of particular value in a steam automobile or in a boat, wherein it is possible to place the steam generating unit out of sight and still be fully informed as to the condition of the water therein.

I am aware that changes in the form, construction and arrangement of parts may be made without departing from the spirit and without sacrificing the advantages of the invention and I reserve the right to make all such changes as fairly fall within the scope of the following claims.

I claim:

1. The combination with a steam generator and a burner, of an electric circuit including said burner, said burner circuit being normally closed, a chamber having communication with said generator, a float in said chamber adapted to be operated by the level of the liquid in the generator, a switch in said circuit, a U-shaped rod having one leg arranged in the chamber and connected to the float and the other leg arranged alongside the chamber outside thereof and adapted to operate said switch, and air-tight means enclosing said rod and said switch whereby the liquid in said chamber will be prevented from passage to said switch.

2. The combination with a steam generator and a burner, of an electric circuit including said burner, said burner circuit being normally closed, a chamber having communication with said generator, a float in said chamber adapted to be operated by the level of the liquid in the generator, a switch in said circuit, an extension at the bottom of said float chamber, a tubular member alongside said chamber and communicating with said extension and enclosing said switch at its upper end, and a U-shaped rod having one leg arranged in the chamber and extension and connected with the float and its other leg arranged in the extension and the tubular member and adapted to operate said switch.

3. The combination with a steam generator and a burner, of an electric circuit including said burner, said burner circuit being normally closed, a chamber having communication with said generator, a float in said chamber adapted to be operated by the level of the liquid in the generator, a switch in said circuit, an extension at the bottom of said float chamber, a tubular member alongside said chamber and communicating with said extension, a U-shaped rod having one leg arranged in the chamber and extension and connected with the float and its other leg arranged in the extension, and water tight means mounted on said tubular member and protecting the switch operating end of said last mentioned leg from water from the float chamber.

4. The combination with a steam generator, an electric switch and a burner, of an electric circuit including said switch and burner, said burner circuit being normally closed, a chamber having communication with said generator, a float in said chamber adapted to be operated by the level of the liquid in the generator, means for supplying liquid to said generator and including a plurality of circuits, switches in said circuits, and a single means controlled by the float for operating the switch in the burner circuit and the switches in the water supply circuit.

5. The combination with a steam generator and a burner, of an electric circuit including said burner, said burner circuit being normally closed, means for indicating different levels of water in said generator and comprising separate electric circuits, means to close said water level circuits, means to open said burner circuit when the water in the generator reaches the predetermined low level, and a float device carrying said closing means and said opening means.

6. The combination of a liquid container, a reservoir, a connection between said container and reservoir, a check valve at said connection and adapted to be operated by the difference in pressure on opposite sides thereof, a by-pass joining said connection between the reservoir and check valve, positive means to force the liquid from the reservoir to said check valve or to said by-pass, a valve in said by-pass, an electric motor for operating said by-pass valve, an electric circuit including said motor, means comprising an electric circuit and a series of lights in said circuit to indicate the level of liquid in the container, and float means associated with said container for controlling said indicator circuit and said by-pass valve circuit.

WILLIAM E. BAKER.